United States Patent
Grasshoff

(10) Patent No.: US 10,910,847 B2
(45) Date of Patent: Feb. 2, 2021

(54) ACTIVE CELL BALANCING IN BATTERIES USING SWITCH MODE DIVIDERS

(71) Applicant: Eric Paul Grasshoff, San Marcos, CA (US)

(72) Inventor: Eric Paul Grasshoff, San Marcos, CA (US)

(*) Notice: Subject to any disclaimer, the term of this patent is extended or adjusted under 35 U.S.C. 154(b) by 395 days.

(21) Appl. No.: 15/961,604

(22) Filed: Apr. 24, 2018

(65) Prior Publication Data

US 2019/0199106 A1  Jun. 27, 2019

Related U.S. Application Data

(60) Provisional application No. 62/658,364, filed on Apr. 16, 2018, provisional application No. 62/609,063, filed on Dec. 21, 2017.

(51) Int. Cl.
*H01M 10/46* (2006.01)
*H02J 7/00* (2006.01)

(52) U.S. Cl.
CPC .......... *H02J 7/0019* (2013.01); *H02J 7/0021* (2013.01)

(58) Field of Classification Search
CPC ...... H02J 7/0021; H02J 7/0016; H02J 7/0019; H02J 7/0072; H02J 7/00712; H01M 2010/4271
USPC .......................... 320/107, 116, 118, 119, 122
See application file for complete search history.

(56) References Cited

U.S. PATENT DOCUMENTS

| | | | |
|---|---|---|---|
| 5,504,415 A | 4/1996 | Podrazhansky et al. | |
| 5,528,122 A | 6/1996 | Sullivan et al. | |
| 5,578,914 A | 11/1996 | Morita | |
| 5,631,534 A | 5/1997 | Lewis | |
| 5,773,959 A | 6/1998 | Merritt et al. | |
| 5,897,973 A | 4/1999 | Stephenson et al. | |
| 5,920,179 A | 7/1999 | Pedicini | |
| 5,982,142 A | 11/1999 | Sullivan et al. | |
| 6,008,623 A | 12/1999 | Chen et al. | |
| 6,081,095 A | 6/2000 | Tamura et al. | |
| 6,118,275 A | 9/2000 | Yoon et al. | |
| 6,150,795 A | 11/2000 | Kutkut et al. | |
| 6,271,645 B1 * | 8/2001 | Schneider | H02J 7/0021 320/118 |
| 6,452,363 B1 | 9/2002 | Jabaji | |
| 6,750,631 B2 | 6/2004 | Perelle | |
| 6,806,686 B1 * | 10/2004 | Thrap | H02J 7/345 320/118 |

(Continued)

FOREIGN PATENT DOCUMENTS

CN  201466770 U  5/2010
CN  107086625 A  8/2017

(Continued)

OTHER PUBLICATIONS

James Moran, "Power Pump™ Balancing", Application Report, PMP—battery Management Solutions, Texas Instruments, Jul. 2009—Revised Oct. 2011.

(Continued)

*Primary Examiner* — Edward Tso
(74) *Attorney, Agent, or Firm* — John L. Rogitz

(57) ABSTRACT

A battery cell balancing system contains a switch mode circuit employing voltage sensors across the cells, and current sensors on the balancing legs to enable reliable and efficient cell balancing during battery charge.

16 Claims, 3 Drawing Sheets

(56) References Cited

U.S. PATENT DOCUMENTS

| | | |
|---|---|---|
| 7,193,392 B2 | 3/2007 | King et al. |
| 7,245,108 B2 | 7/2007 | Chertok et al. |
| 7,378,818 B2 | 5/2008 | Fowler et al. |
| 7,400,114 B2 | 7/2008 | Anzawa et al. |
| 7,489,109 B1 | 2/2009 | Qian et al. |
| 7,612,530 B2 | 11/2009 | Konishi et al. |
| 7,615,966 B2 | 11/2009 | Houldsworth et al. |
| 7,786,699 B2 | 8/2010 | Demers et al. |
| 7,808,244 B2 | 10/2010 | Barsukov et al. |
| 7,856,328 B2 | 12/2010 | Barsoukov et al. |
| 7,888,910 B2 | 2/2011 | Zeng |
| 7,973,514 B2 | 7/2011 | Gong et al. |
| 8,115,453 B2 | 2/2012 | Houldsworth et al. |
| 8,242,738 B2 | 8/2012 | Barsukov |
| 8,253,378 B2 | 8/2012 | Lee et al. |
| 8,421,416 B2 | 4/2013 | Hsu et al. |
| 8,441,234 B2 | 5/2013 | Cheng et al. |
| 8,450,978 B2 | 5/2013 | Barsukov et al. |
| 8,476,869 B2 | 7/2013 | Shiu et al. |
| 8,581,549 B2 | 11/2013 | Hartzog |
| 8,736,231 B2 | 5/2014 | Sutardja |
| 8,766,597 B2 | 7/2014 | Nork et al. |
| 8,901,884 B2 | 12/2014 | Maleus |
| 8,901,885 B2 | 12/2014 | Kelty et al. |
| 8,937,457 B2 | 1/2015 | Sutardja et al. |
| 8,963,494 B2 | 2/2015 | Kishiyama et al. |
| 8,965,721 B2 | 2/2015 | Paryani |
| 8,970,173 B2 | 3/2015 | Kelty et al. |
| 8,970,182 B2 | 3/2015 | Paryani et al. |
| 9,000,726 B2 | 4/2015 | Sakurai et al. |
| 9,046,580 B2 | 6/2015 | Hermann |
| 9,130,377 B2 | 9/2015 | Barsukov et al. |
| 9,153,990 B2 | 10/2015 | LePort et al. |
| 9,197,091 B2 | 11/2015 | Kishiyama et al. |
| 9,201,121 B2 | 12/2015 | Barsukov et al. |
| 9,203,121 B2 | 12/2015 | Liu |
| 9,209,631 B2 | 12/2015 | Hermann et al. |
| 9,225,179 B2 | 12/2015 | Liu |
| 9,225,197 B2 | 12/2015 | Krauer |
| 9,236,748 B2 | 1/2016 | Barsukov et al. |
| 9,257,729 B2 | 2/2016 | Hermann et al. |
| 9,270,127 B2 | 2/2016 | Coenen et al. |
| 9,276,415 B2 | 3/2016 | Soong |
| 9,356,467 B2 | 5/2016 | Lammeren |
| 9,362,772 B2 | 6/2016 | Hua et al. |
| 9,385,553 B2 | 7/2016 | Aiura |
| 9,705,340 B2 | 7/2017 | Lucea |
| 9,774,206 B2 | 9/2017 | Kim et al. |
| 9,847,655 B2 | 12/2017 | Bailly et al. |
| 9,853,497 B2 | 12/2017 | Heidenreich et al. |
| 9,893,539 B2 | 2/2018 | Nakamura et al. |
| 9,979,211 B2 | 5/2018 | Barsukov et al. |
| 2003/0017753 A1 | 1/2003 | Palmisano et al. |
| 2004/0189248 A1 | 9/2004 | Boskovitch et al. |
| 2006/0022639 A1 | 2/2006 | Moore |
| 2007/0049134 A1 | 3/2007 | Conroy et al. |
| 2008/0180061 A1 | 7/2008 | Koski et al. |
| 2011/0062917 A1 | 3/2011 | Shiu et al. |
| 2011/0316344 A1 | 12/2011 | Lammeren |
| 2011/0316483 A1 | 12/2011 | Zhang |
| 2013/0057198 A1 | 3/2013 | Gerlovin |
| 2014/0084871 A1 | 3/2014 | Densham et al. |
| 2014/0232346 A1 | 8/2014 | Zhang et al. |

FOREIGN PATENT DOCUMENTS

| | | |
|---|---|---|
| EP | 2854254 A1 | 4/2015 |
| JP | 2005521363 A | 7/2005 |
| KR | 101423064 B1 | 7/2014 |
| WO | 2011158051 A1 | 12/2011 |

OTHER PUBLICATIONS

International Search Report and Written Opinion from the counterpart PCT application PCT/US2018/065523 dated Apr. 25, 2019.

"Effective LiFePO4 Battery Charging and Maintenance", CTEK Lithium US, www.smartercharger.com.

"Fundamentals of Qnovo Adaptive Charging in Lithium Ion Batteries", Qnovo, 2015.

"Programmable Li-Ion PCM", Arbarr Electronics Ltd., Antrim, Northern Ireland/Denver, Colorado year 2000.

Da Howey, V Yufit, PD Mitcheson, GJ Offer, NP Brandon, "Impedance measurement for advanced battery management systems", EVS27, Barcelona, Spain, Nov. 17-20, 2013.

David Capano, Sheldon S. Williamson, "Power Electronics Intensive Battery Management Systems for Electric Transportation", NSERC Canada Research Chair Program, University of Ontario Institute of Technology (UOIT), Ontario, Canada, Mar. 20-23, 2017.

Dr. Gregory L. Plett, "Cell Balancing", from the course Battery Management and Control, University of Colorado, Spring 2015.

Jong-Won Shin, Gab-Su Seo, Chang-Yoon Chun, Bo-Hyung Cho, "Selective Flyback Balancing Circuit with Improved Balancing Speed for Series Connected Lithium-ion Batteries", School of Electric Engineering and Computer Science, Seoul National University, Jul. 2010, Seoul, Korea.

Keith James Keller, "Improved LiFePO4 cell balancing in battery-backup systems with an Impedance Track™ fuel gage", Analog Field Applications, Texas Instruments, Incorporated, 2013.

Kevin B. Scott, Sam Nork, "Active Battery Cell Balancing", Linear Technology, Aug. 18, 2016.

Kevin B. Scott, Sam Nork, "Passive Battery Cell Balancing", Linear Technology, Aug. 18, 2016.

M. Brandl, H. Gall, M. Wenger, V. Lorentz, M. Giegerich, F. Baronti, G. Fantechi, L. Fanucci, R. Roncella, R. Saletti, S. Saponara, A. Thaler, M. Cifrain, W. Prochazka, "Battery and Battery Management Systems for Electric Vehicles", Design, Automation & Test in Europe Conference & Exhibition, Mar. 12-16, 2012, Dresden, Germany.

Niaoki Matsumura, "Battery Cycle Life Extension by Charging Algorithm to Reduce IOT Cost of Ownership", Intel, 34th International Battery Seminar & Exhibit, Mar. 23, 2017.

Phillip Weicker, "A Systems Approach to Lithium-Ion Battery Management", sections of pp. 190-192, 2014, Artech House, Norwood, MA.

Siqi Li, Chunting Chris Mi, Mengyang Zhang, "A High-Efficiency Active Battery-Balancing Circuit Using Multiwinding Transformer", IEEE Transactions on Industry Applications, Jan./Feb. 2013, vol. 49, No. 1.

Tony Armstrong, Samuel Nork, "Maximize the Run Time in Automotive Battery Stacks Even as Cells Age", Analog Dialogue, vol. 51, Dec. 2017.

Yevgen Barsukov, Jinrong Qian, "Battery Power Management for Portable Devices", Chapter 4, 2013, Artech House, Boston/London.

Yuang-Shung Lee, Guo-Tian Cheng, "Quasi-Resonant Zero-Current-Switching Bidirectional Converter for Battery Equalization Applications", IEEE Transactions on Power Electronics, Sep. 2006, vol. 21, No. 5.

* cited by examiner

ACTIVE CELL BALANCING IN BATTERIES USING SWITCH MODE DIVIDERS

FIELD

The application relates generally to balancing battery cells during charging or discharging.

BACKGROUND

Cells connected in series in rechargeable batteries tend towards an out-of-balance state when subjected to repeated charge/discharge cycles, or when left uncharged for long periods of time. This problem is common in rechargeable battery systems and is particularly acute in lithium-ion batteries (LIBs). Existing attempts to mitigate this out-of-balance problem have met with only limited success.

SUMMARY

Accordingly, an apparatus includes at least first and second battery cells such as Lithium-ion cells arranged in electrical series with each other and defining a primary charge/discharge path. A balancing circuit is arranged in electrical parallel with the primary charge/discharge path. The balancing circuit includes a balancing line in turn including a cell junction between two respective cells, and a respective voltage sensor in the balancing line between respective cell junctions to generate a signal representative of voltage across the respective cell. To each cell junction, a respective switch mode divider (SMD) is connected via a respective balancing leg in electrical parallel with the voltage sensor of the respective cell. Additionally, a respective current sensor is in electrical series in each balancing leg and is useful to cause the respective SMD to limit current through the balancing leg to which the current sensor is connected. At least one controller is provided for controlling the SMDs to equalize the voltages of the respective cells.

The signal from the current sensor is provided to the controller, which modulates the SMDs based on signals from the current sensors to limit current through the balancing legs to be no more than a threshold current magnitude.

In examples, the controller modulates the SMDs based on signals from the current sensors to limit current through the balancing legs to be no more than a threshold current only upon at least one cell reaching full charge voltage during battery charge.

In another aspect, an assembly includes at least one switch mode divider (SMD) connectable in parallel to at least one respective battery cell and operable to equalize voltages between plural cells during charging of the cells. At least one current sensor is associated with a control output voltage of the SMD to enable the SMD to limit current from the SMD to at least one cell during charging.

In another aspect, a method includes modulating plural switch mode dividers (SMDs) associated with respective cells to equalize voltage between the cells during battery charge or discharge. The method further includes limiting current in at least one balancing leg associated with at least one SMD to satisfy a threshold. The threshold specifies the maximum magnitude of current that can pass through the balancing leg in either direction (positive or negative current).

The details of the present application, both as to its structure and operation, can best be understood in reference to the accompanying drawings, in which like reference numerals refer to like parts, and in which:

DETAILED DESCRIPTION

Figure 1:
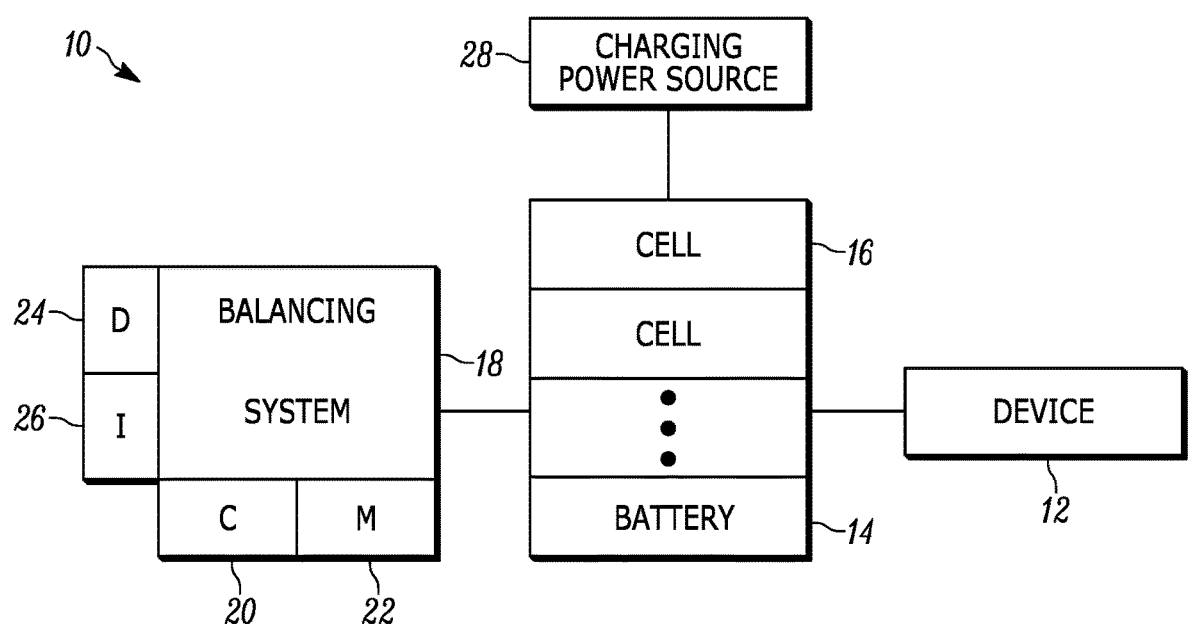
FIG. 1 is a block diagram of an example system consistent with present principles.

This disclosure relates generally to charging batteries and has particular relevance to charging rechargeable batteries that use cells that have low dynamic impedance, one example of such is Lithium-ion batteries. A system herein may include batteries, components powered by the batteries, and charging assemblies that may include one or more computing components to control charging. Charging assemblies may include one or more processors executing instructions that configure the assemblies to control charging consistent with present principles. As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device, or an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C # or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The following terms may be used herein:

Battery Capacity—the amount of energy available in a battery, typically expressed in Amp-hours (Ah) or Watt-hours (Wh) for larger batteries.

Cell—is an electrical energy storage unit, typically consisting of an anode, a cathode, an electrolyte and a separator. A battery can consist of a single cell or many cells connected in series and/or in parallel. In the context of balancing a battery, a group of cells connected in parallel is treated as a single large cell.

State of Charge (SOC)—the amount of energy available in a cell or battery at any given moment, typically stated as a percent of Full Battery Capacity (FBC).

State of Health (SOH)—an indication of the present Full Battery Capacity (FBC) of a battery relative to the battery's Nominal Battery Capacity when it was new. For example, if the nominal capacity of a battery (when new) is 200 Ah, and after some period of use the FBC drops to 160 Ah, then the SOH of the battery is 80%.

Primary Charge Path—refers to a charging path straight down the series of battery cells.

Balance—A battery is balanced when, at the terminal stage of charging, the cell voltages have been equalized in which every cell (where "cell" can be a group of individual cells connected in parallel) is at Full Charge Voltage and charging has typically continued thereafter until the balancing current has dropped to a threshold low level as further explained below, at which point the battery is balanced.

Equalize—is used to describe the process of reducing differences in cell voltages during the charging and balancing process with a goal of bringing a battery into balance.

Note that "balanced" and "out of balance" are relative terms. For present purposes a battery is considered balanced if the SOCs of all the cells in the battery are within approximately ±1% of each other.

Balancing Current—refers to the differences in charge (or discharge) current applied to a subset of the cells in the battery to attempt to bring the cells into balance.

Balancing Leg—refers to a conductive path that is off the Primary Charge Path and that is used for applying charge or discharge currents to a subset of cells in an attempt to balance the battery.

True Battery Capacity—is the capacity of a battery when every cell in the battery is charged to 100% SOC.

Available Battery Capacity—the capacity of a battery at any given instant.

Nominal Battery Capacity—refers to nominal capacity of a battery when new.

Full Battery Capacity—refers to the available capacity in the battery after the charging system has charged the battery as fully as the system is capable of.

True Battery Capacity vs. Full Battery Capacity—If a charging system cannot or does not bring every cell up to 100% SOC at the end of a complete charge cycle, then Full Battery Capacity will be less than True Battery Capacity.

Cell Voltage—the voltage of a cell at any instant.

Nominal Voltage—the average or mean voltage of a cell or battery over the flat region of the discharge curve.

Full Charge Voltage—the voltage to which a cell or battery is brought to at the end of a charging cycle.

Cell Impedance—refers to cell voltage divided by cell current.

Dynamic Impedance—the first derivative of the voltage with respect to current–dV/dI.

Now specifically referring to FIG. 1, an example system 10 is shown, which may include one or more of the example devices mentioned above and described further below in accordance with present principles. The first of the example devices included in the system 10 is a device 12, such as a consumer electronics (CE) device, e.g., a tablet computer, a notebook computer, a wearable computerized device, a computerized Internet-enabled bracelet, other computerized Internet-enabled devices, a computerized Internet-enabled music player, computerized Internet-enabled head phones, a computerized Internet-enabled implantable device such as an implantable skin device, etc. Other example devices 12 include energy storage modules (such as battery arrays) in electric vehicles, industrial power systems, and storage devices used in power grid or structure electrical systems.

The device 12 may be powered by a rechargeable battery 14, such as a Lithium-ion battery with plural cells 16 connected together in electrical series with each other, it being understood that while only a single connection 18 is shown between the battery 14 and device 12, more than one electrical line typically connects the battery to the device. The battery 14 may be removably or non-removably coupled to the housing of the device 12. A Lithium-ion battery may be implemented by any battery that uses a lithium-based electrolyte, such as Lithium Iron Phosphate, Lithium Cobalt Oxide, Lithium Nickel Manganese Cobalt Oxide, Lithium Ion Manganese Oxide, Lithium Nickel Cobalt Aluminum Oxide, Lithium Titanate or any other battery chemistry with an electrolyte that uses lithium ions. While present principles envision, in example embodiments, use in connection with Li-ion batteries, present principles contemplate use with any appropriate stored enemy source or storage element, in particular (though not exclusively) those that exhibit a low dynamic impedance characteristic during charge/discharge.

As discussed further below, a balancing system 18 can be electrically connected to the battery 14 while charging or discharging the battery 14. The balancing system 18 can be incorporated all or in part within the housing of the device 12 or it may be separate therefrom. The balancing system 18 can be enclosed inside the battery case or it can be disposed outside the battery case.

Among the components of the balancing system 18 that are more fully disclosed below are at least one controller 20 and at least one data storage medium 22. If desired, the balancing system 18 may also include one or more displays 24 such as a liquid crystal display (LCD) and one or more input devices 26 such as a network interface, universal serial bus (USB) port, key entry device, etc. A network interface may provide for communication over one or more networks such as the Internet, a wide area or local area network, a Wi-Fi network, a wireless telephony network, a Bluetooth network, etc.

The data memory 22 may be, without limitation, disk-based or solid-state storage that is not a transitory signal. The memory may be removable media.

In any case, as discussed further below, the balancing system 18 acts to equalize the voltages of the individual cells 16 during charging from a charging power source 28.

Figure 2:
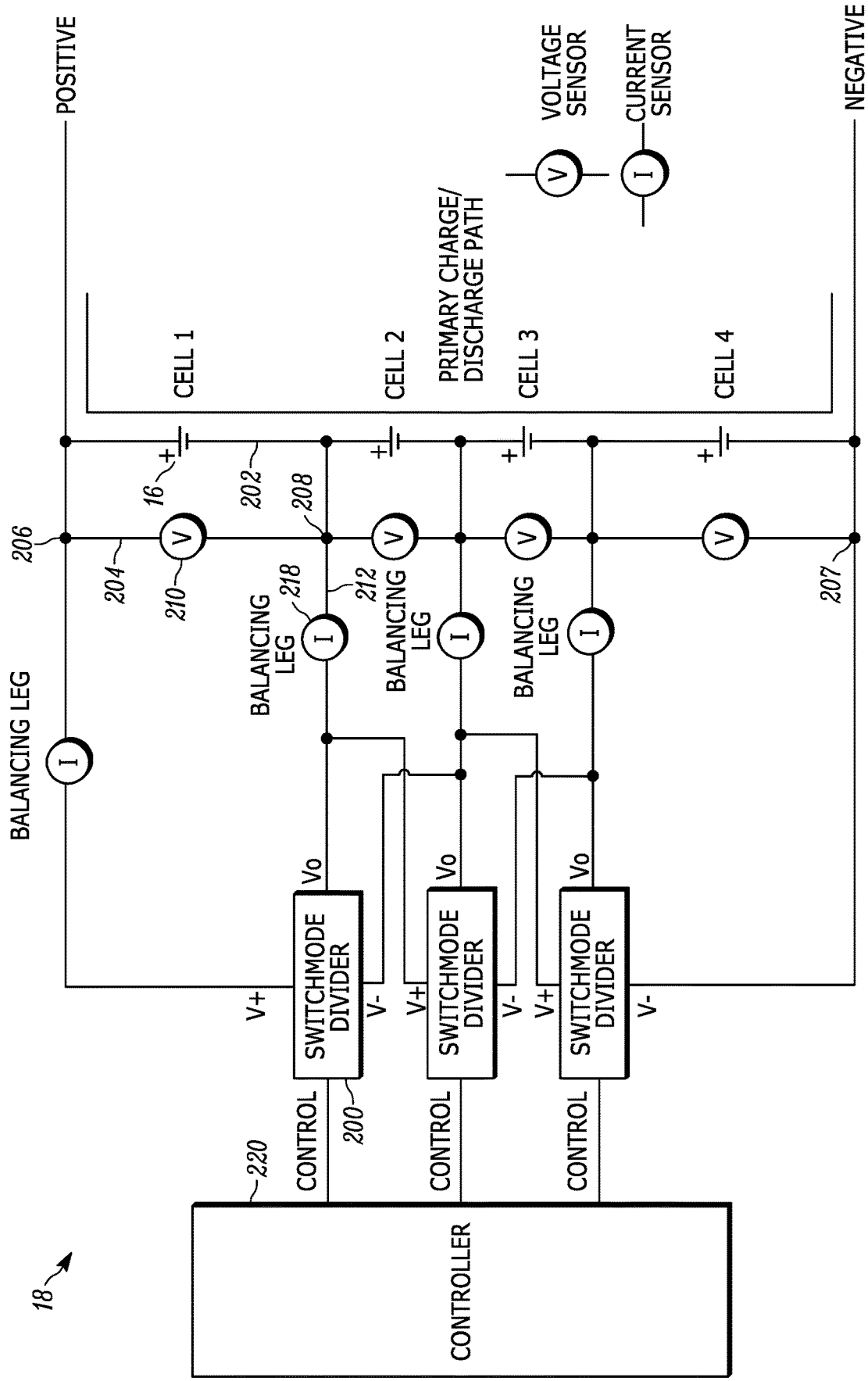
FIG. 2 is a schematic diagram of a circuit for balancing cell voltage during charging of a battery such as a Lithium-ion battery with multiple cells in series.

Turning now to FIG. 2 for a more detailed depiction of an example balancing system 18, the balancing system 18 includes plural switch mode dividers (SMDs) 200. As understood herein, a balancing system that uses SMDs 200 can overcome limitations of less efficient balancing systems. The low impedance current paths of the switch mode design provide greatly improved efficiency, but this results in a control system with high loop gain, rendering the control loop very sensitive to even the most modest differences in voltages of the cells 16. Current sensors 218 in the below-described balancing legs 212 of the balancing system 18 are used to determine whether the current in the balancing legs 212 is within the threshold range that is specified by the below-described threshold(s) for the balancing system 18. This current measurement enables the balancing system 18 to limit the loop gain of the circuit, resulting in more effective control of the high-gain loop.

In general, and prior to describing the details of the balancing system 18, the SMDs 200 are high power (low impedance) voltage dividers. The control output voltage Vo is a function of the duty cycle of the drive waveform and the high and low rail voltages of the SMD 200.

In accordance with switch-mode circuit techniques, each SMD 200 is driven by a constant period signal having a unique ON time and OFF time, the sum of which two times is essentially always equal to the total constant period. SMD modulation takes the form of Pulse Width Modulation in that the ratio of ON time to total period (also defined as duty cycle) is adjusted to vary the control output voltage Vo in direct correspondence.

If the duty cycle is 50%, the output voltage will be at the midpoint between the high rail voltage and the low rail voltage. The low impedance of the SMD-based balancing system 18 allows relatively large balancing current levels to be applied to the cells 16 at very high efficiency. Because both the SMD 200 and the Li-ion cell 16 are very low impedance devices which are essentially connected in parallel, a very small change in the duty cycle, creating a small voltage difference, produces a relatively high corresponding level of differential balancing leg current. When changing the voltage of low impedance cells to charge and/or balance them, the resulting high-gain response can create feedback instability for the balancing system, a problem that is addressed by use of the below-described current sensors 218 in the balancing legs 212.

Accordingly, and turning to the details of FIG. 2, plural battery cells 16, in the example shown four battery cells, are arranged in electrical series with each other as shown to define a primary charge/discharge path 202. The balancing circuit 18 is arranged in electrical parallel with the primary charge/discharge path 202 as shown.

The balancing circuit 18 includes a balancing line 204 in parallel with the primary charge/discharge path 202. The balancing line 204 includes a positive node 206 to which the "high" or positive side of the first SMD 200 (the top-most labeled V+ in FIG. 2) is electrically coupled and a negative node 207 to which the "low" or negative side of the last SMD 200 (the bottom-most labeled V− in FIG. 2) is electrically coupled. The control output $V_0$ of each SMD 200 is connected to a respective balancing leg 212 that includes a respective current sensor 218 and terminates at a respective cell junction 208 between adjacent cells 16 as shown. Note that in example embodiments a total of N-1 SMDs 200 are provided for N cells 16. Note further that in order from top to bottom, the negative side (V−) of the top-most SMD 200 is connected to the control output voltage Vo of the next (middle, in the example shown) SMD 200, while the positive side V+ of the middle SMD 200 is connected to the control output voltage Vo of the top-most SMD, with this pattern propagating down the SMDs as shown.

In other words, the positive rail (V+) of each SMD 200 is connected to the balancing leg 212 that is next highest in the series or s connected to the positive node 206 if there is no higher balancing leg in the series. The negative rail (V−) of each SMD 200 is connected to the balancing leg 212 that is next lowest in the series or is connected to the negative node 207 if there is no lower balancing leg in the series. The control output voltage Vo of each SMD 200 is connected to the balancing leg 212, which passes through the current sensor to the respective cell junction 208.

A respective voltage sensor 210 is in the balancing line 204 between each respective cell junction 208 in electrical parallel with a respective cell 16 to generate a signal representative of voltage across the respective cell 16. The voltage sensors 210 are communicatively coupled to the controller 220 described further below, so that the controller 220 receives voltage information from the respective voltage sensor 210.

The control output voltage Vo of each SMD 200 is connected via a respective balancing leg 212 to the respective cell junction 208. The balancing legs 212, in some examples, consist of the electrical circuit shown between the nodes shown connecting Vo to the respective cell junctions 208. A respective current sensor 218 is electrically connected to the balancing legs 212 in electrical series between the control output voltage Vo from each SMD 200 and the respective cell junction 208 to generate a signal representative of current through the respective balancing leg 212. Note that the current sensor 218 shown in FIG. 2 in the top-most positive line that includes the positive node 206 is optional. Each current sensor 218 is communicatively coupled to the controller 220 discussed below so that the controller receives balancing leg current information from the current sensors 218.

Accordingly, at least one controller 220, preferably a digital microcontroller, is connected to the SMDs 200 to modulate the SMDs 200 to establish the control output voltage Vo of each SMD 200 that adds to or subtracts from the voltage on the primary charge path 202 for the respective cell 16 to maintain current on the balancing legs 212 within certain limits as explained further below.

In establishing the control output voltage Vo, the duty cycle of the SMD 200 is increased to raise the output voltage and decreased to lower it as discussed above and further explained below.

Figure 3:
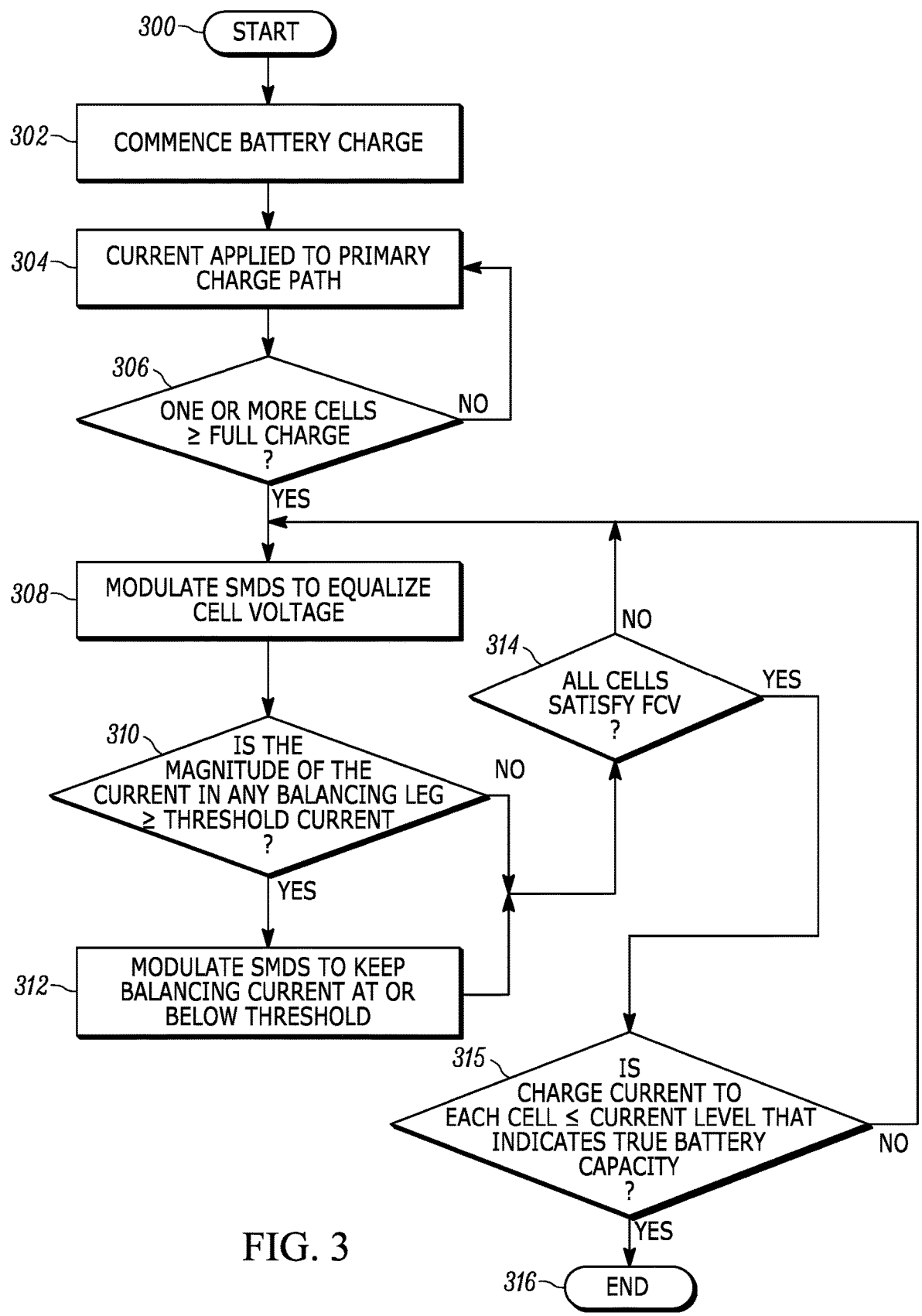
FIG. 3 is a flow chart of example logic according to an example embodiment.

FIG. 3 illustrates the operation of the balancing system 18 shown in FIG. 2. The process begins at start state 300. Battery charge is commenced at block 302 on a battery 14 with each cell 16 at any SOC and with the cells 16 in any condition of balance or out-of-balance, typically below Full Charge Voltage. Block 304 indicates that charging is commenced by applying charge current, preferably at a maximum threshold level, flowing from the positive to negative terminals on the primary charge/discharge path 202. The maximum threshold level of the primary charge path current is not required to be identical to the balancing leg threshold current. The two threshold currents may be identical or different for any particular implementation.

The voltage of each cell 16 is monitored using the respective voltage sensors 210, and when it is determined at decision diamond 306 that at least one cell 16 reaches or exceeds Full Charge Voltage (FCV), the logic proceeds to block 308 to modulate the SMDs 200 to equalize the cell voltages. That is, in example implementations the cell equalization with current-limiting operation discussed below starts only when the first cell reaches FCV. In other embodiments input from the current sensors is used by the controller to limit current through the balancing legs to be no more than a threshold current magnitude before at least one cell reaches full charge voltage during battery charge.

Should a cell 16 reach a voltage above full charge voltage as indicated by the respective voltage sensor 210 of the cell 16, the controller 220 lowers the voltage of the cell 16 by modulating the SMD 200 that is associated with the overvoltage cell 16 to reduce the cell's voltage at a controlled rate until the voltage is at or just below FCV.

As the SMDs 200 are being used to alter the cell voltages, the logic determines at decision diamond 310 whether the magnitude of the current (positive or negative) as measured by any balancing leg current sensor 218 is at or beyond a threshold value, typically a maximum allowed current magnitude. This applies to limiting both negative and positive current, because balancing current can flow in either direction. Note that one threshold may be used for negative current and another, different threshold may be used for positive current, or a single threshold may apply to both. Should the magnitude of any balancing leg current satisfy the threshold, e.g., by being at or beyond the threshold at decision diamond 310, for instance as a result of having applied modulation of block 308 at an excessive rate of change, the logic moves to block 312 to modulate the SMDs 200 to adjust the voltages of adjacent cells 16 to bring the balancing leg current magnitude at or below the threshold.

In other words, if at any time during the balancing process, the control of the output voltages Vo to equalize the cell voltages are adjusted in a manner that results in the magnitude of the current in any balancing leg 212 to be at or beyond the limit threshold, then the modulation of an SMD 200 that is at and/or adjacent to the balancing leg 212 with excessive current is adjusted to reduce the voltage differential between the cell 16 with excessive balancing current and one or both adjacent cells 16.

The controller 220 preferably establishes as much of the allowed magnitude of balancing current as possible, albeit always below the maximum permitted threshold, to provide for the fastest charging and balancing without violating the threshold for balancing leg current magnitude. Thus, in example embodiments the balancing current magnitude is maintained at a high level at or below a threshold to prevent overcurrent conditions that could damage the cells 16 or pose a safety hazard.

The above monitoring of voltage and current data and SMD modulation continues preferably until at least one and more preferably two conditions are met. As indicated at decision diamond 314 it is determined whether all cells 16 have reached FCV. If not, the process loops back to block 308. If all cells have reached FCV, the logic can move from decision diamond 314 to decision diamond 315 to determine whether the current to each cell has decreased to a level indicative of the battery 14 having reached True Battery Capacity. If so, the process ends at state 316. Otherwise, the logic loops back to block 308.

In modulating the SMDs 200, if the controller 220 determines, based on the signal from a balancing leg current sensor 218, that the current flowing in the balancing leg 212 is too high (e.g., above the threshold) in the positive direction (from the SMD 200 into the respective cell 16) then the duty cycle of the SMD 200 is reduced to lower its control output voltage Vo. On the other hand, if the current in the balancing leg 212 is too great in the negative direction then the controller modulates SMD 200 to increase its duty cycle and thus raise its control output voltage Vo.

Note that the controller 220 samples all cell voltages as indicated by the voltage sensors 210 for ongoing modulation of the SMDs 200 to equalize cell voltages while maintaining balancing leg current magnitudes at or below the threshold for balancing currents. When SMD control output voltage Vo at any one cell 16 is altered, it will affect the adjacent cells 16 and adjacent balancing leg currents because the cells 16 are connected in series, so modulation and adjustment of the output voltages of the SMDs 200 is typically an ongoing process while the balancing system 18 is operating.

If desired, the threshold magnitude for the balancing leg current may be established as a function of battery capacity, chemistry of the battery, design of the battery, and use environment. In general, the threshold magnitude of the balancing leg current is selected to be a suitable percentage of the maximum permissible charging current based on the design objectives of the battery system. A higher balancing current threshold allows the cells 16 to reach a balanced state in a shorter time, but a too-high threshold can lead to cell damage, so the threshold is established to ensure current in the balancing leg 212 remains below the cell stress level.

As an example, in larger batteries balancing current range threshold of 5% to 10% of the maximum primary charge current is typically sufficient to ensure 100% balancing within an hour or two under conditions of the battery 14 and cells 16 that would typically occur. The closer the SOCs of the cells 16 are to each other, the lower the balancing range required to achieve complete balance over any given time period. Some designers may opt for a lower range of 2% to 3%, for example, to save cost; while others may opt for a higher range (20% or 30% for example) if faster balancing times are more important than system cost.

It may now be appreciated that currents on the balancing legs 212 can be advantageously used as proxies for the charge current to each cell 16 in the primary charge path 202. As understood herein, current in the balancing legs 212 correlates closely enough to the main charging current on the primary charge path 202 that it can be used to determine when each cell 16 has reached 100% SOC. This allows the current sensors 218 to be placed on the balancing legs 212 and allows use of current sensors 218 with much lower current rating than would be needed to sense current on the primary charge path 202. The use of two inputs—current on the balancing legs 212, and voltage on each cell 16—enables very high efficiency (from the switch mode circuit) and very good stability (from the addition of the current sensors 218). Moreover, the circuit 18 can reliably, efficiently and accurately bring every cell 16 in the battery 14 up to 100% SOC at the end of every complete charge cycle. In other words, by monitoring cell voltage and balancing leg current, the controller 220 can detect when cells 16 reach Full Charge Voltage and then subsequently reach 100% SOC. When a cell 16 first reaches Full Charge Voltage, it is usually not yet at 100% SOC, so additional charging is typically required after Full Charge Voltage to bring the cell up to 100% SOC, which is made possible by the balancing leg current sensor 218 input, which enables accurate, reliable determination of when a cell 16 has reached 100% SOC. An indication of 100% SOC occurs when a cell 16 is at Full Charge Voltage as indicated by the respective voltage sensor 210 and current to the cell 16 as indicated by the current sensor 218 associated with the cell 16 has dropped to a very low level, typically around 0.05 C to as low as 0.01 C, wherein "C" is a measure of current rate relative to a capacity of the cell.

Furthermore, locating the current sensors 218 on the balancing legs 212 avoids compromising the battery's primary charge path 202.

In addition to enabling management of the inherent differences in voltage drop among the various cells 16, using the balancing current as an input to the feedback loop used by the controller 220 mitigates the instability disadvantage of the low impedance SMD 200 configuration while maintaining all the added advantages of that configuration. Using the current sensors 218, cell voltages need only be approximately measured, while limiting the current in the balancing legs 212 to a finite maximum level effectively eliminates potential loss of control of a high-gain charging system.

Still further, current and voltage sensors of relatively low accuracy (typical accuracy of 2% of maximum cell voltage for the voltage sensors 210 and 0.03 C for the current sensors 218) are sufficient because the accuracy (or resolution) of voltage and current measurement only needs to be great enough to detect possible runaway current conditions and make corrections to prevent them, and to ensure that cells 16 do not rise above Full Charge Voltage and/or do not approach Maximum Cell Voltage (the maximum voltage a cell can be charged to without incurring risk of damage to the cell.)

Also, current sensors 218 on the balancing legs 212 can be rated to be relatively small and inexpensive as compared to current sensors that might be placed in the primary charge path 202; the current sensors 218 on the balancing legs 212 do not siphon off energy from primary charge path 202, which would reduce the efficiency of the system; and unlike larger current sensors on the primary charge path, balancing leg current sensors do not generate undue heat.

Because high charge current can be efficiently and safely applied throughout the charge cycle, with charge current dropping to a low level as each cell 16 reaches Full Charge Voltage, faster charge cycles than currently are provided are realized by the circuit 18. Furthermore, the balancing circuit 18 can balance cells 16 that are significantly out of balance. As long as no cell 16 is defective (essentially, as long as all cells can be charged), the balancing circuit 18 can bring every cell 16 in the battery 14 up to 100% SOC and into balance with all of the other cells 16 in the battery 14, regardless of the SOC of each cell 16 at the start of the charge cycle.

Variations in cell characteristics do not affect the balancing performance of the balancing circuit 18. In other words, the balancing circuit 18 can fully charge and balance a battery regardless of variations in cell characteristics.

The SMDs 200 are modulated by the controller 220 to independently regulate the charge current to each cell 16 until each cell 16 reaches Full Charge Voltage and high impedance, at which point each cell 16 has reached 100% SOC. In non-limiting embodiments, this can be accomplished while minimizing stress on the cells by modulating the SMDs 200 to establish cell voltages that will bring low voltage cells 16 up rather than bringing high voltage cells 16 down, minimizing current shunting between cells 16. In general but without limitation, cells 16 can be brought from a discharged state up to a fully charged state in a steady upward charge cycle, with very little or no discharges from individual cells 16 as part of the balancing scheme during charging.

In addition to the advantages noted above, the present balancing circuit 18 eliminates the need to discharge cells 16 through load resistors to maintain balance and overcomes limitations on balancing range that are inherent in some systems. The present balancing circuit 18 enables use of current sensors 218 rated for only a small fraction of the ampacity of the battery, which reduces cost of the current sensing system, because the full main charge current can be applied for most of the charging cycle with the balancing circuit 18 switching on only when at least one cell 16 reaches Full Charge Voltage. At this point the other cells 16 have also been charged for some time and will typically be close to Full Charge Voltage. Accordingly, in example embodiments the cell balancing is performed by the instant balancing circuit 18 only near the end of each charge cycle when all of the cells 16 are near Full Charge Voltage and only a small amount of balancing current is needed to quickly balance the cells 16 and bring all of them to 100% SOC.

While the above-described balancing process contemplates cell equalization during battery charge, the same principles also may be used during battery discharge. In an embodiment, the logic in controller 220 balances the cells 16 in the battery 14 during a discharge cycle (typically when the battery 14 is powering a load). The logic that equalizes cell voltages while limiting the current on the balancing legs 212 thus may be employed during discharge cycles as well as during charge cycles.

As understood herein, balancing during discharge cycles can increase the available capacity of the battery 14. If there is a significant difference in capacities of cells 16 in the battery 14 (for example, if the smallest cell has a capacity of 90% or less of the largest cell), a management system that is typically provided for a battery will electrically disconnect the battery from the load when the smallest cell has reached a minimum cell voltage. On the other hand, if a battery is balanced during discharge, stored energy in higher voltage (or higher SOC) cells will be transferred to cells with lower voltage for lower SOC).

With the present balancing circuit 18, there is no need to collect, store and analyze data on battery charge and discharge cycles to try to mitigate inherent inaccuracies in estimating SOC.

The above methods may be implemented as software instructions executed by a controller 220 such as a processor, a suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the internet.

It will be appreciated that whilst present principals have been described with reference to some example embodiments, these are not intended to be limiting, and that various alternative arrangements may be used to implement the subject matter claimed herein.

What is claimed is:
1. Apparatus comprising:
at least first and second Lithium-ion battery cells arranged in electrical series with each other and defining a primary charge/discharge path;
a balancing circuit arranged in electrical parallel with the primary charge/discharge path, the balancing circuit comprising:
a balancing line comprising a respective positive node and a respective negative node and at least one cell junction between respective adjacent cells, a respective voltage sensor being in the balancing line in electrical parallel to a respective cell to generate a signal representative of voltage across a respective cell;

a respective switch mode divider (SMD) connected via a respective balancing leg to a respective cell junction of the balancing line in electrical parallel with a respective voltage sensor, a respective current sensor being electrically connected to a respective balancing leg and being useful to enable the respective SMD to limit current through the balancing leg to which the current sensor is connected; and at least one controller configured for controlling the SMDs to equalize voltages between cells.

2. The apparatus of claim 1, wherein control outputs Vo of the respective SMDs are connected to the respective balancing legs, and a first SMD comprises a negative side V-connected to the negative node, the respective control output Vo of the first SMD being connected to a negative side of a second SMD.

3. The apparatus of claim 2, wherein a third SMD comprises a positive side coupled to the positive node, the respective control output of the third SMD being electrically connected to a positive side of an adjacent SMD.

4. The apparatus of claim 1, wherein the current sensor generates a signal representative of current through the balancing leg to which the current sensor is connected, the signal from the current sensor being provided to the controller.

5. The apparatus of claim 4, wherein the controller is configured to modulate the SMDs based on signals from the current sensors to limit current through the balancing legs to be no more than a threshold current magnitude.

6. The apparatus of claim 5, wherein the controller is operable to modulate the SMDs based on signals from the current sensors to limit current through the balancing legs to be no more than a threshold current magnitude before at least one cell reaches full charge voltage during battery charge.

7. The apparatus of claim 5, wherein the controller is configured to modulate the SMDs based on signals from the current sensors to limit current through the balancing legs to be no more than a threshold current magnitude only upon at least one cell reaching full charge voltage during battery charge.

8. The apparatus of claim 1, wherein the controller is configured for controlling the SMDs to equalize voltages between cells during battery charge.

9. The apparatus of claim 1, wherein the controller is configured for controlling the SMDs to equalize voltages between cells during battery discharge.

10. Assembly, comprising:
at least one switch mode divider (SMD) connectable in parallel to at least one respective battery cell and operable to equalize voltages between plural cells during charging of the cells; and at least one current sensor associated with a control output voltage of the at least one SMD to enable the SMD to limit current from the SMD to at least one of the cells during charging, wherein the at least one SMD comprises plural SMDs associated with respective cells and respective current sensors in respective balancing legs of the respective SMDs, at least one controller for modulating the SMDs to equalize cell voltage, the controller receiving information from the current sensors.

11. The assembly of claim 10, comprising the battery cells, the battery cells comprising Lithium-ion cells.

12. The assembly of claim 10, wherein at least one current sensor is associated with at least a first SMD, and the controller is operable to modulate the SMDs to maintain current as indicated by the current sensor in satisfaction of a threshold.

13. The assembly of claim 12, wherein the battery cells are arranged in electrical series with each other and define a primary charge/discharge path, and the SMDs and current sensors are components of a balancing circuit arranged in electrical parallel with the primary charge/discharge path, the balancing circuit comprising:

a balancing line comprising a respective positive node and a respective negative node and cell junctions between the positive and negative node, a respective voltage sensor being in the balancing line in parallel with a respective cell to generate a signal representative of voltage across a respective cell;

a respective SMD being connected via a respective balancing leg to a respective cell junction of the balancing line in electrical parallel with a respective voltage sensor, the respective current sensor being electrically connected to the balancing leg for each respective cell and useful to enable the respective SMD to limit current through the balancing leg to which the current limiting component is connected.

14. The assembly of claim 13, wherein a positive side of a first SMD is coupled to the positive node and a respective control output voltage of the first SMD is connected to a positive side of an adjacent SMD.

15. The assembly of claim 14, wherein a negative side of a second SMD is coupled to the negative node and a control output of the second SMD is connected to a negative side of an adjacent SMD.

16. The assembly of claim 12, wherein the controller is operable to modulate the SMDs to maintain current as indicated by the current sensor in satisfaction of a threshold only responsive to at least one cell reaching full charge voltage during battery charge.

* * * * *